Sept. 2, 1958 W. N. TORPEY 2,850,449
SEWAGE TREATMENT
Filed Oct. 17, 1955 4 Sheets-Sheet 2

INVENTOR
Wilbur N. Torpey
BY
ATTORNEY

Sept. 2, 1958　　　W. N. TORPEY　　　2,850,449
SEWAGE TREATMENT
Filed Oct. 17, 1955　　　　　　　　　　4 Sheets-Sheet 3

INVENTOR.
Wilbur N. Torpey
BY Theodore M. Jablon
ATTORNEY

United States Patent Office 2,850,449
Patented Sept. 2, 1958

2,850,449

SEWAGE TREATMENT

Wilbur N. Torpey, New York, N. Y.

Application October 17, 1955, Serial No. 540,866

7 Claims. (Cl. 210—10)

This invention relates to improvements in the disposition of sewage sludges and more particularly to the treatment and disposal of the sewage sludges which result from clarification treatment of the sewage, this being a continuation-in-part of my application Ser. No. 334,513 filed February 2, 1953, which in turn was a continuation-in-part of my parent application Ser. No. 279,737, both now abandoned.

In a more specific sense, this invention relates to the purification of the raw sewage whereby the sewage liquid is freed of settleable solids and otherwise sufficiently purified as by aeration or aerobic treatment to be inoffensive and to be fit for release into open bodies of water, whereas the solids portion or settleable solids are removed from clarification tanks together with a minor portion of the sewage liquid, in the form of sewage sludges containing inorganic as well as organic matter. The organic matter so removed in the form of sludges will in due course produce highly offensive decomposition products, so it must be disposed of or rendered innocous prior to such possible obnoxious decomposition.

A conventional system of sewage treatment comprises clarification in a primary sedimentation tank followed by biological aerobic treatment of the primary clarifier tank overflow in various modifications, examples of which are the conventional activated sludge process, step aeration, high rate activated sludge treatment (modified aeration), conventional trickling filtration and such modifications thereof as bio-filtration and high rate filtration; and secondary or final clarification in a secondary sedimentation tank. Thus, there is obtainable what are known as the raw primary and the secondary sludges.

The invention is concerned with the disposition of such putrescible sludges and more particularly with the problem of concentrating them in preparation for further disposal. Such disposal of the sludge can be carried out in various ways one of which is anaerobic digestion whereby putrescible organic sewage solids are converted into gas while the residue is rendered in an inoffensive form known as digested sludge. To effect such anaerobic digestion, raw sludge is fed to a closed digester tank the function of which per se is well known, where the sludge is held long enough under controlled temperature conditions to allow anaerobic bacteria to convert certain sludge solids into gas. Digested solids settling to the bottom of the tank are withdrawn therefrom in the form of digested sludge while gas is released and conducted from the tank while so-called digester supernatant liquor is drawn from the top portion of the liquid body in the tank. Such supernatant liquor is returned to the raw sewage influent to the plant for retreatment since it contains digestion decomposition products, suspended as well as dissolved requiring such retreatment.

The gas generated by such digestion can provide a source of energy employable to furnish power for the operation of a sewage treatment plant, and it will furnish heat for maintaining the digester contents necessary and favorable for digestion. While the digester with its accessories may thus pay for itself to some extent by furnishing power and heat, such a digester along with appurtenances is a very expensive investment especially where the detention time necessary for the digestion of large quantities of relatively dilute sludges requires a large digester volume. The digester installation represents a substantial portion of the total cost, capitalization, and operation of the sewage treatment plant. This invention is concerned with the problem of concentrating sludges to be sent to the digester in order that digester volume might be reduced.

It is among the objects of this invention to consistently produce raw sewage sludge at a significantly higher concentration than has heretofore been attainable and to effect large savings with respect to further handling and disposal of the sludge. A more specific object is to effect large savings in digester volume requirements.

The significance of such savings is illustrated by reference to the present day type of multi-stage digestion system. Therein the sludge is subjected to digestion in a primary digester tank where the bulk or nearly all of the digestible organics are converted into gas under conditions of ebullition not conducive to solids separation; from this primary tank the sludge is transferred to a secondary digester tank where only a relatively small portion of gas is produced and where substantially quiescent conditions are desirable to encourage solids sedimentation, in order that supernatant liquor may be released. Thus, it is an object to furnish to the digester system a sludge so highly concentrated that after digestion in a single stage system, the digested sludge will be of a concentration comparable to that derived from an adequate two stage digester system. Not only will this eliminate the need for secondary digestion but there will also be a substantial reduction in digester tank volume as compared with the present primary digester tank itself. Furthermore, the problem of supernatant liquor will be substantially eliminated.

Certain chemicals or dosing agents are sometimes added to sewage sludges for the purpose of promoting solids concentration. Such agents may be coagulating agents, or they may be agents having the effect of discouraging gas formation such as might occur because of long detention time in a settling tank. For example, chlorine is employed as a bactericidal or bacteriostatic agent to delay and postpone biochemical decomposition while lime or ferric chloride may be employed to coagulate. But chemical dosing is expensive, thus it is also among the objects of this invention to produce a raw sludge of exceptionally high concentration without the need of such chemicals.

The above stated objects are attainable by providing for instance primary raw sludge for thickening at a low enough solids concentration attainable by the addition of a diluent liquid or liquor such as may be in the nature of aerobically treated sewage or other diluent liquid, or by drawing the primary sludge at a suitably low solids concentration, that is significantly lower than the conventional.

In the practice of this invention, a sludge derived from a primary clarifier is supplied to a separate thickening tank wherein a sludge bed or strata is allowed to form in a separate thickening tank in a manner so controlled that a high density raw sludge can be consistently withdrawn while the detention time of the sludge solids in the bed is controlled so as to be short enough to avoid biochemical decomposition with consequent deterioration of the thickener effluent yet long enough to produce the desired high solids concentration. This invention teaches how such a high raw solids concentration is attainable rapidly under controlled conditions and prior to biochemical decomposition.

For the purpose of such control of the solids detention time there is herein established the concept of relative solids detention time which is the ratio of the sludge bed volume in the tank to the volume of thickened sludge withdrawn from the tank per day which ratio is herein called the Sludge Volume Ratio (S. V. R.). Additional control factors to be correlated with the solids detention time are the solids loading rate (lbs./sq. ft./day) and the liquid loading rate (gals./sq. ft./day).

Thus, the invention revolves around controlling the thickening operation by coordinating and interrelating those operating factors which comprise the Thickener Influent Concentration, the Solids Detention Time, the Solids Loading Rate, the Liquid Loading Rate, and in addition the Sludge Bed Depth to the end of obtaining high raw sludge concentration along with high solids containment in and by the thickener tank.

In the practice of this invention, the thickening operation is controlled with respect to sludge volume ratio or solids detention time as governed by the temperature and biological characteristics of the sludge or sludges being thickened. An increase in sludge temperature intensifies biological activity with the result that gaseous decomposition products develop to cause sludge to rise to the surface deteriorating the quality of the thickener effluent. By controlling the sludge volume ratio in accordance with the prevailing sludge temperature there will be produced consistently a thickener effluent of a satisfactory quality to suit the particular plant requirements while maintaining the high concentration of the thickened sludge.

A distinction from prior practice lies in the fact that the primary clarifier can be operated such that the sludge be purposefully withdrawn in a dilute state and thus in a fresh or less aged condition in which it is passed to a separately controlled thickening tank. This is in contrast with conventional practice which strives to obtain maximum possible sludge density in the primary clarifier. This purposefully sacrifices some of the density of the primary sludge itself in order to obtain the sludge less aged. In this way, the thickening process of this invention greatly increases the efficiency of the primary clarifier as well as the total plant efficiency.

This concept of process control is here further illustrated by means of a sludge thickening behavior curve, in which sludge concentration is plotted vs. solids detention time in the sludge bed in the thickener.

In the thickening tank the sludge solids will first settle and incrementally thicken in accordance with the just mentioned behavior curve. The solids entering the tank first undergo plain settling while still relatively free from one another, the rate of such settling being a function of the size, shape, and specific gravity of the solids relative to that of the liquor as well as the viscosity of the liquor itself and thereafter they undergo compacting or thickening during which phase the solids become increasingly contiguous with respect to one another, as they re-arrange and adjust themselves to one another in their further downward progress. The initial plain or straight settling phase takes place relatively quickly, whereas subsequent consolidation of the solids during thickening or compacting proceeds more slowly with the solids still continuing their downward movement although at a slower rate.

The thickening process of this invention is conducted in view of the characteristics of a behavior curve plotted to show the relationship of sludge concentration on the ordinate and detention time on the abscissa (i. e. time of detention of the sludge solids in the sludge bed). That behavior curve shows the concentration of the sludge being withdrawn first to rise sharply or relatively "steeply" as a function of solids detention time and thereafter much more slowly, so that there is noted a "break" in the curve representing this relationship of solids concentration to detention time. With the operating factors selected and maintained as proposed by this invention one may choose a detention time in relation to the other operational factors during which the thickening process is carried on in an operative range definable by the upper portion of this behavior curve, namely substantially at or even past the "break" of that curve. Being able to operate consistently with such controls in a range upon the upper portion of the behavior curve provides operational flexibility with respect to absorbing fluctuations such as may occur in the characteristics of the incoming sludges, without incurring drastic variations or sacrifice in thickened sludge concentration. Also by reason of such flexibility characteristics one may vary the detention time in accordance with the seasonal temperature changes without incurring substantial or drastic variations or sacrifices in thickened sludge concentration.

A treatment system to embody this invention by way of example is what is known as the activated sludge treatment system which comprises as basic components a primary settling clarifier station, and aerating tank or station, and a secondary clarification station. That is to say, raw sewage passes through the primary clarifier tank so that sediment in the form of the raw inorganic and raw organic sewage matter together with a portion of the sewage liquor may be withdrawn from the tank bottom as so-called raw primary sludge, while the bulk of the sewage liquor still carrying suspended non-settleable fine organic solids passes from the tank as primary effluent. This primary effluent with its suspended, colloidal and dissolved matter passes to and through an aeration tank there to be subjected to aeration in the presence of a previously activated biological floc, whereby most of the suspended, colloidal and dissolved matter is coagulated or coalesced and rendered settleable. Enough oxygen usually in the form of compressed air must be supplied to the contents of the aeration tank to support biological utilization thereof by the biological life in the tank. Sewage thus aerobically treated passes from the aeration tank through a secondary or final clarifier tank where the secondary solids resulting from the aerobic treatment settle to be withdrawn from the tank bottom as biological or secondary sludge, while clarified and biologically purified liquid termed the secondary effluent or final effluent passes from the secondary clarifier tank into open bodies of water.

The raw primary sludge formed as a result of primary clarification and sedimentation contains the settleable solids of the raw sewage collected at the bottom of the primary clarifier tank. The raw secondary (biological) sludge resulting from the biological treatment of the primary overflow contains the flora propagated during this biological treatment as well as the soluble, colloidal, and non-settleable suspended solids removed from the primary overflow by this biological treatment.

Variations in density of the raw primary sludge are mainly due to changes in the proportion of volatile matter contained in the sludge solids; variations in density of the secondary sludge depend mainly upon type of biological environment to which the solids were subjected and the length of time spent in such environment, as well as the proportion of volatile matter in the sludge solids.

Ordinarily the primary sludge is pumped from its clarifier tank at a concentration of about 3% to 5% solids. According to present day practice the primary clarifier is called upon to perform a dual function, namely that of removing the settleable solids from the sewage and simultaneously concentrating them which presents a dilemma insofar as the primary sludge must be withdrawn in a dilute state in order to attain a high degree of efficiency with respect to the removal of the settleable fraction of the sewage solids.

But the concentration of the secondary sludge solids is the major problem inasmuch as its biological nature offers exceedingly high resistance to solids concentration. It has been the practice to subject this so highly dilute secondary sludge to separate thickening whereby it would attain a solids concentration of only 2½%. An alternative method of dealing with this dilute secondary sludge consists of returning the secondary sludge to the influent of the primary clarifier tank whereby there is obtained a concentration of mixed primary and secondary sludges of only about 3% solids concentration. Such practice of concurrently concentrating the primary and the secondary solids in the primary sedimentation tank is generally unsatisfactory, inasmuch as it fails to produce any substantial concentrations of sludge, even as it adversely affects the subsequent treatment process. The plant treatment efficiency is thereby impaired because of the escape of solids with the primary effluent which places an additional load upon the secondary treatment process.

To test the practicality and advantages of this invention whereby high sludge densities are obtainable, certain alterations were made to the facilities of a sewage treatment plant employing the high rate activated sludge process for treating some 40 million gallons of sewage daily, in that both the primary and the secondary sludges resulting from a given set of operating conditions in that plant were conducted jointly to a separate thickener tank wherein a sludge bed of controlled depth was allowed to form so as to yield a pumpable sludge of great density far beyond that heretofore attainable. A mixed sludge average density of from around 9% to 14% solids and densities up to 24% were thus obtained. The sludge product thus obtained presented itself as a gray, gelatinous, lumpy mass of somewhat plastic nature.

If the pumping pressure required to move the sludge thus obtainable is plotted against the solids concentration, it was observed from the resulting curve that a sudden rise in pumping pressure occurred substantially in that range of solids concentration corresponding to the break in the aforementioned sludge thickening behavior curve. Thus, it was discovered that the pump pressure is low as long as the sludge concentration for the thickener lies below the values defined by the "break" in the thickening curve, whereas with sludge concentrations above this "break" there occurs an abrupt upward change in pump pressure with only small increments in sludge concentration. This is here interpreted as indicating a significant change taking place in the physical behavior of the sludge in that concentration range, possibly attributable to the formation of a hydrogel.

In view of this relationship of sludge pumpability to the thickening behavior of the sludge, this invention makes it possible to control the pumpability of the thickened sludge by controlling the solids concentration to be maintained at or near the break of the respective behavior curves.

In summary, this invention comprises a method of concentrating, under controlled conditions, sewage sludge containing putrescible volatile matter which is anaerobically digestible. Heretofore such sludge was accepted for disposal substantially at the solids concentration at which it could be delivered from the primary clarification tank where its degree of solids concentration was governed by the clarification requirements imposed upon that tank. For example, primary sludge because of its characteristics was thus obtained at say 3% to 5% solids concentration. This primary clarifier sludge was relatively higher in solids concentration compared to the secondary clarifier sludge which was withdrawn at only about 0.5% solids concentration. Indeed this secondary sludge is viewed as the major problem and consequently prior efforts were directed towards obtaining higher solids concentrations of these secondary sludges.

One aspect of this invention lies in the discovery that primary sludge or a mixture of primary and secondary sludge is amenable to an exceptionally high degree of concentration under certain controlled conditions, and it provides a method of so concentrating such sludges in spite of the normal cyclic or diurnal fluctuations of solids content in the sludge that is being drawn from the clarification tanks.

In controlling the thickening operation in accordance with this invention, primary sludge may be withdrawn from the primary clarification tank at considerably less than the customary solids concentration. In this way, the quality requirements of the primary effluent are not only readily met, but are improved. Also, this thickening control requires that certain solids loading rates be imposed upon the thickening zone within certain upper and lower limits, these loading rates to be significantly above those prevailing with respect to the clarifier. That is to say, the Solids Loading Rate (lbs./sq. ft./day) is to be such as to provide a bed depth sufficiently high for applying the control of the relative solids detention time in terms of Sludge Volume Ratio (S. V. R.) as well as sufficiently high to produce and maintain the desired high concentration, yet insufficiently high to bring about undue loss of containment of sludge solids as well as of sludge solids concentration. Furthermore, the Liquid Loading Rate (gals./sq. ft./day) must be high enough to discourage septicity in the thickener, yet not so high as to unduly reduce the containment of solids in and by the thickening zone. Thus, the depth of the sludge bed is to be kept (by periodical probings or measurements), within an upper limit of operability and a lower limit of operability.

Correlated to these control factors of Liquid Loading Rate, and Solids Loading Rate is the control factor of the relative Solids Detention Time in the bed. A practical expression of the Solids Detention Time, herein developed for the purpose of this invention, is the Sludge Volume Ratio (S. V. R.) defined as the ratio of the volume of sludge bed held to average rate of sludge volume withdrawal per day. It may be seen that the Sludge Volume Ratio is actually an expression of detention time of the sludge solids comprising the sludge bed within the thickener. Thus, if one divides the volume of said sludge bed maintained in the thickener by the volume of sludge withdrawn per day from the thickener (the Sludge Volume Ratio), one obtains the number of days of detention afforded the sludge in the sludge blanket of the thickener. This S. V. R. is to be maintained at a value which provides for the sludge solids in the bed a detention time at which septicity and gasification of the solids are avoidable. In order to maintain that time factor at a desired suitable value, the sludge withdrawal rate or pumpage is adjusted in accordance with changes in bed volume as measurable by the depth of the bed of sludge. In this way, the Sludge Volume Ratio is maintainable at a suitable value while operating within the upper and lower limits of bed depth, within which the fluctuations in Solids Loading Rate are absorbable without substantial loss of solids concentration and containment.

When practicing the invention according to these teachings, a suitable sludge volume ratio (S. V. R.) is maintainable within a range corresponding to the upper portion of the aforementioned thickening behavior curve. For instance, if the Solids Loading Rate increases the depth of the sludge bed will increase, but a suitable sludge volume ratio is nevertheless maintainable by increasing the sludge withdrawal rate correspondingly. On the other hand, if because of a decrease of the load the sludge bed will decrease in depth, the sludge withdrawal rate will be decreased correspondingly until balance again is attained. Cyclic or diurnal fluctuations in solids load are thus absorbable even while a high sludge concentration as well as a high quality of primary effluent are thus maintainable.

According to one aspect of this invention, in order to attain those high sludge solids concentrations, the Solids Loading Rates can be kept high enough so that small changes in solids detention time will express themselves in relatively large or conspicuous changes or differentials in the depth of the sludge bed. This renders the process of this invention highly "time-sensitive" with respect to the solids detention time to be allowed for the sludge solids in the bed. But these high sludge concentrations are attainable and maintainable by at least periodically determining the sludge bed depth and correctively maintaining the depth (by change of sludge withdrawal rate) within the aforementioned upper and lower limits of operability, and with values of the Solids Loading Rate, the Liquid Loading Rate, and the S. V. R. correlated with respect to one another.

Briefly and broadly stated, the invention requires that the Solids Detention Time as well as the Liquid Loading Rate be correlated to the Solids Loading Rate, while maintaining depths of sludge bed within the upper and lower limits of operability in such a manner that thickened sludges are obtainable at the high solids concentrations corresponding to the upper portion of the thickening behavior curve that is substantially above the steeply ascending initial portion thereof, yet without undue loss of solids containment.

As this invention may be embodied in several forms without departing from the spirit or essential characteristics thereof, the present embodiment is therefore illustrative and not restrictive since the scope of the invention is defined by the appended claims rather than by the description preceding them, and all changes that fall within the metes and bounds of the claims, or of forms that are their functional as well as conjointly cooperative equivalents, are therefore intended to be embraced by those claims.

Reference may be had to the accompanying drawings, in which.

Figure 1:
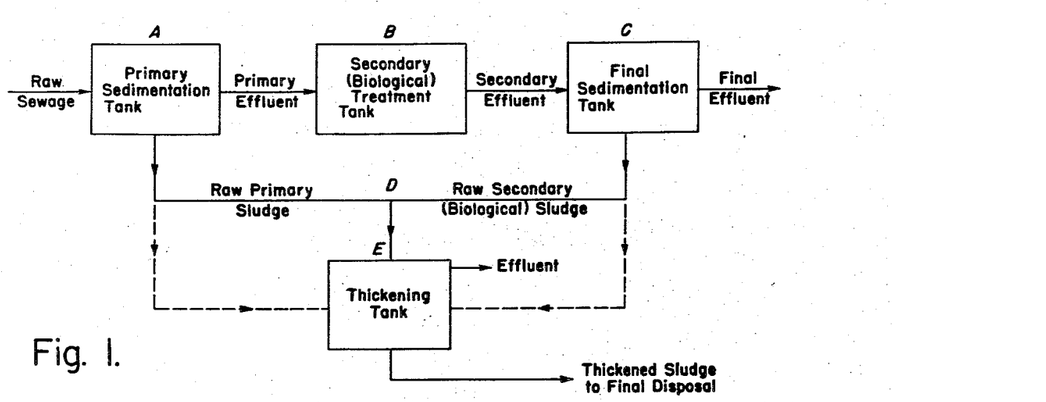
Figure 1 is a schematic flow diagram employing the thickening process in a primary and secondary treatment plant.

Referring now to Figure 1, raw sewage enters the primary sedimentation tank A where it undergoes sedimentation normally for a period of from one to three hours. Thereafter the primary effluent passes to a tank B where it undergoes secondary or aerobic biological treatment. This biological treatment includes such processes as are known as activated sludge, step aeration treatment, high rate activated sludge treatment (otherwise known as modified aeration), trickling filtration, or high rate trickling filtration and their various modifications. Whatever the kind of biological treatment used, the effluent from it may then pass to the final sedimentation tank C where such effluent usually undergoes sedimentation for a period of from one to three hours. The final effluent is discharged to a stream or watercourse. The raw primary sludge formed as a result of the treatment in tank A is pumped or flows to point D which may be a pipe junction, mixing device or mixing tank. The secondary (biological) sludge may flow, or be pumped, from either or both of tanks B and C or any of their appurtenances to be conducted also to point D there to mix or conjoin with the raw primary sludge. The mixture of sludges there formed is conducted to a thickening tank E. As an alternative, the raw primary and raw secondary sludges described as conjoining at D to be mixed prior to entry into tank E could be introduced separately into the tank as indicated by the broken lines on the flow diagram, to be mixed and concentrated in the tank at the same time.

Figure 5:
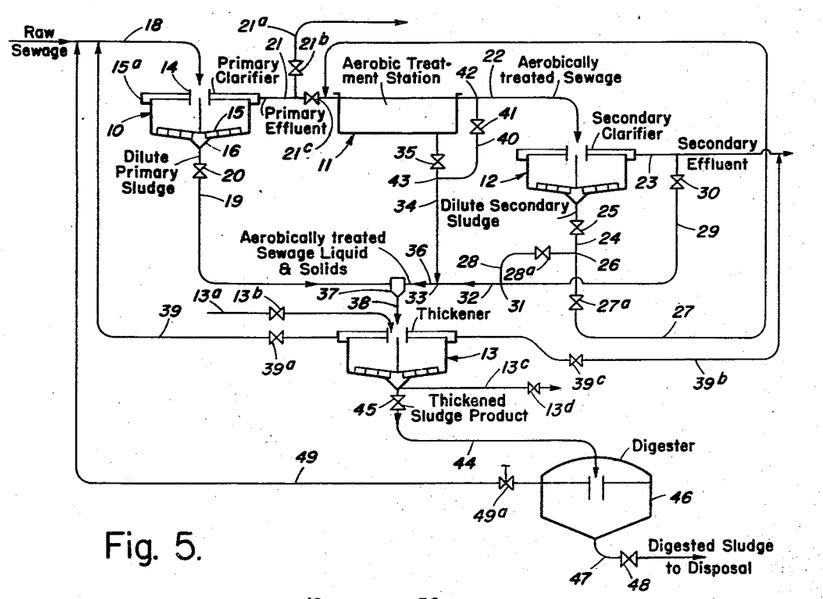
Figure 5 is a flow diagram for practicing this thickening process in several of its embodiments.

Prior to the present improvement in the operation of the above referred to sewage treatment plant and during its operation in conjunction with the high rate activated sludge process the primary sludge contained less than 5% solids, while the secondary sludge contained about 4% solids. After the facilities of that plant had been altered when operating it in accordance with the process of the present invention, it was found that the mixed sludge pumped from a separate thickening tank, such as tank E, contained from about 9% to about 14% solids and as high as about 24% solids. As a consequence of operating the plant in accordance with the new method there was achieved a reduction of about two-thirds in the total volume of sludge required to be handled for further or final disposition.

In order to secure and maintain continuously successful operating results in and from the thickening tank E, control of the process must be exercised in view of the variations and influence of a number of factors. Sludge temperature varies with the seasonal temperature changes. The higher the temperature of the sludge the greater the biological activity, and this activity may increase in the thickening tank to the point where gas is generated in a quantity sufficient to "buoy up" the thickened sludge thus reducing the solids containment and so the efficiency of the process. The solids load on the thickening tank will vary in accordance with the amount of solids captured by the treatment processes which furnishes the primary and secondary raw sludges. Sludges vary as to the relative proportions of raw primary and raw secondary solids contained in them, and also as to the biological composition of the raw secondary sludge. Therefore, the concentration of the thickened sludges increases when the relative quantity of secondary solids decreases and vice versa. Furthermore, when the quantity of biological life increases in the secondary sludge the thickened sludge concentration decreases and vice versa. Another consideration is that the proportion of volatile matter contained in the sludge solids varies and, as that proportion increases the thickened sludge concentration decreases and vice versa.

Figure 2:
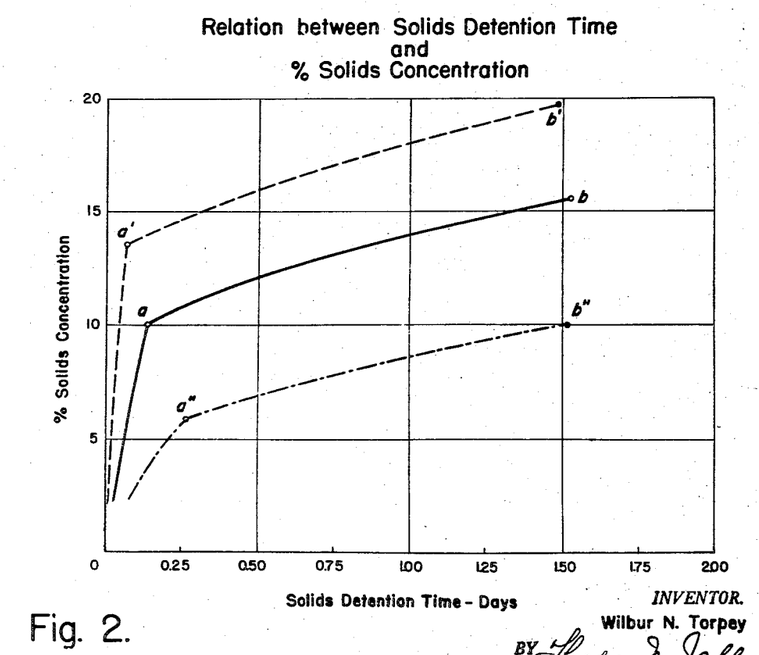
Figure 2 is a graph showing by way of thickening behavior curves the relationship between the concentration of solids and the time of their detention in a sludge bed.

A significant relationship exists between the sludge concentration in thickening tank E as a function of the length of time that the sludge solids are detained therein, the values of which relationship will differ for each type of sludge. That relationship is illustrated by such curves as shown in Figure 2, wherein one typical curve based on actual test is represented by the solid line for one type sludge, in which the percent solids concentration of the thickened sludge is plotted against the solids detention time in days, the other curves representing other types of sludges. It will be noted that during approximately the first one-eight day (up to the point on the curve indicated at $a$) there is noted a rapid increase in the concentration of the solids. In this case there was attained approximately a concentration of 10% solids within that time. As the solids detention time increased further, however, there was noted a marked leveling off of the rate of increase in concentration, although concentrations in excess of 10% along line $a$—$b$ of the graph were obtained. Of the two other curves in Figure 2 the one $a'$—$b'$ in dotted lines is indicative of a sludge having a higher solids content, the other $a''$—$b''$ being indicative of a sludge having a lower solids content than the sludge first mentioned. In all cases, however, there can be discerned the characteristic rapid initial rise in solids concentration during a short first period of detention time in the tank, ending respectively at the points marked $a$, $a'$ and $a''$, followed by a slowing down of the rate of solids concentration with increases in the detention time along the upper shallow ascending portions of the curves a—b, a'—b' and a"—b" respectively.

These thickening behavior curves must be viewed relative to the time of detention of the solids in the bed of sludge. When the sludges first enter the tank their solids are in a suspended state, but in the relatively quiescent conditions within the tank these solids rapidly begin to sink downwardly under the influence of gravity. So long as they are in this primarily suspended state, the movement of the solids is restricted less by their physical contact with each other than by the resistance of the liquid. However, as the solids become compacted their movements become limited by their physical proximity to each other and compaction becomes a matter of rearrangement of the particles as well as a downward movement so that a sludge bed may be formed below the liquid level in the tank. Gasification if allowed to develop in the sludge bed will upset the thickening operation with consequent loss of concentration and of solids containment. Hence solids detention time is a critical factor which must be carefully controlled in a manner according to the teachings and precepts of this invention.

Although in the practice of this invention the thickening process may be controlled so that the solids detention time is reducible to a practical minimum, it is not to be reduced to a point where wide fluctuations in sludge concentration would be experienced. On the other hand, if the solids are retained in the thickener for a period long enough to produce gasification, the consequent "boiling up" of the sludge bed will not only reduce the solids concentration attainable but will also deteriorate the thickener effluent. For optimum process results, therefore, it is desirable to so control the solids detention time in the bed for any given type of sludge to be thickened that it will be long enough to be at or past the break in the thickening behavior curve, yet short enough to be below the point of potential gasification. However, it should be borne in mind that a rise in the temperature of the contents of the thickening tank will reduce the time at which gasification will occur, and vice versa.

Figure 4:
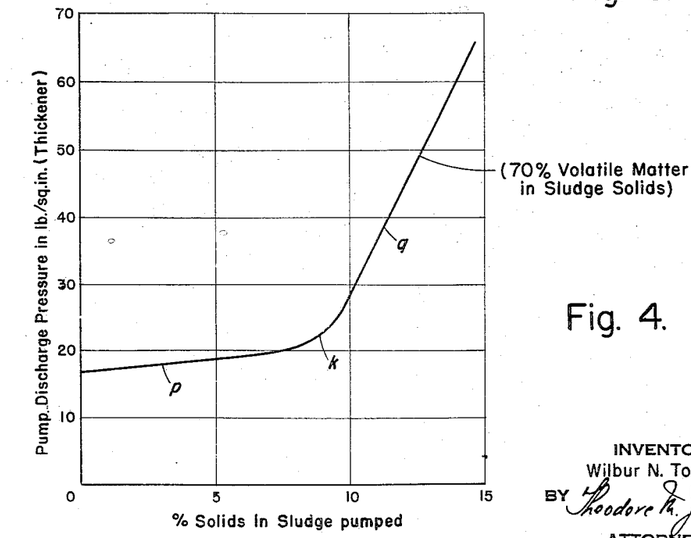
Figure 4 is a graph illustrating behavior characteristics of a mixture of primary and modified aeration sludge in terms of solids concentration vs. pump discharge pressure.

The graph of Figure 2 shows the solids concentration plotted against sludge detention time, whereas in Figure 4 the solids concentration is plotted against the pump pressure required for discharging the thickened sludge under certain operating conditions. While these two graphs (Figures 2 and 4) are thus interrelated by reason of the factor of percent solids concentration, a comparison of both graphs shows that the break at point $a$ in Figure 2 occurs approximately at the same sludge solids concentration as appears at the break $k$ in the graph of Figure 4. Furthermore, a comparison of the two graphs in Figures 2 and 4 indicates that the behavior pattern of the sludge solids in the gravity system of Figure 2 is substantially similar to that in the pressure system of Figure 4.

The Figure 4 graph comprises an initial portion $p$ of a shallow gradient leading up to a sludge concentration value of about 10% and a subsequent portion $g$ having a steep gradient, and a transitional portion or break $k$ between them. The Figure 4 graph thus substantiates and corroborates what in the course of this invention was found to be characteristic of the physical property and behavior of the new sludge product of this process and further identified by the laboratory test criteria presented below.

The Figure 5 flowsheet exemplifies a treatment system more fully implemented to include alternatives of plant operation, for attaining the thickening results of this invention.

The Figure 5 flowsheet comprises a primary clarifier tank 10, an aerobic treatment station 11, a secondary clarifier tank 12, and a thickener 13. The primary clarifier tank 10 is diagrammatically shown to be of the well-known type equipped with mechanical means for sludge collection and removal. This clarifier tank has a feedwell 14, a rotary raking structure 15, an effluent overflow launder 15a, and an underflow or sludge discharge cone 16. The secondary clarifier tank 12 as well as the thickener tank 13 similarly may comprise a feedwell, a raking structure, an effluent launder, and a sludge discharge cone.

Raw sewage is currently supplied to the primary clarifier tank 10 by feed conduit 18 leading to the feedwell 14 of the primary clarifier. Primary clarifier sludge discharges by way of a primary sludge conduit 19 having a control valve 20. Primary effluent carrying a suspension of as yet non-settleable solids passes through a conduit 21 leading from the primary effluent launder 15a to the aerobic treatment station 11 here shown to be in a form of an aerating tank, although it may be in some other form of biological treatment apparatus, for example, a so-called biofilter, whereby the desired aerobic treatment of the primary effluent is achieved.

Aerobically treated sewage passes from the aerating station 11 through a conduit 22 to the feedwell of the secondary clarifier tank 12. An overflow discharge conduit 23 passes secondary effluent from the effluent launder of that tank. Secondary underflow or secondary sludge passes from the secondary clarifier tank 12 through a sludge discharge conduit 24 provided with a control valve 25, leading to a branch point 26 where one branch 27 through a control valve 27a leads to the influent end of the aerating tank to provide return sludge for aerobic station 11, while another branch 28 having a control valve 28a in effect leads to the feedwell of the thickener 13.

The secondary effluent conduit 23 has a branch conduit 29 provided with a control valve 30, which leads to a juncture 31 with branch conduit 28 to supply thereto a controllable volume of secondary sewage liquor. A conduit 32 leads from juncture 31 to a juncture 33 there to be joined by an auxiliary conduit 34 leading from the aerator tank 11 and provided with a control valve 35 to supply a controllable volume of aerobically treated sewage from the aerobic treatment station to the thickener station 13. That is to say, a conduit 36 leads from juncture 33 to a juncture 37 to be joined by the primary underflow conduit 19. From juncture 37 a conduit 38 passes the sludge into thickener 13. The thickened sludge from tank 13 is dischargeable either to digestion treatment as through conduit 44 or dischargeable to other kinds of disposals as through conduit 13c.

The alternatives thus included in Figure 5 allow for the controlled admission to the thickener 13 of primary clarifier sludge via conduit 19 of activated or aeration sludge via conduit 34, and of secondary clarifier sludge via conduits 24, 28, 32, 36. This arrangement also provides facilities for controllably supplying secondary effluent liquor via conduits 29, 32, 36 as well as facilities for controllably supplying to thickener 13 auxiliary liquid from other sources as via conduit 13a.

The confluence of primary and secondary clarifier sludges at juncture 37 may be in some form of a premixing tank provided with a suitable kind of mixing means.

A return conduit 39 with control valve 39a leads from the effluent launder of the thickener 13 to and into the raw sewage influent conduit 18 feeding the primary clarifier 10. There is also shown to be provided a conduit 39b having a control valve 39c for optionally discharging effluent from the thickener 13 along with secondary effluent.

A by-pass conduit 40 with control valve 41 is shown to lead from a branch point 42 of conduit 22 to a branch point 43 of conduit 34, so that a portion of aerobically treated sewage may be selectively drawn either directly from the tank 11 itself or else from the effluent thereof.

For sludge digestion, thickened sludge from thickener 13 passes through a conduit 44 provided with control valve 45 so that the thickened sludge may pass to a closed digester tank 46 having a discharge conduit 47 for the withdrawal of digested sludge, provided with a control valve 48. This digester may be of a conventional type provided with gas takeoff and sludge heating means. While there is also shown a usual conduit 49 for returning digester supernatant liquid to the primary clarifier, it is to be noted that when supplying to the digester the highly thickened raw sludge produced by the practice of this invention, the amount of supernatant liquor released from the digester will be negligibly small or absent. In the absence of supernatant liquor the control valve 49a of conduit 49 may be closed.

Figure 6:
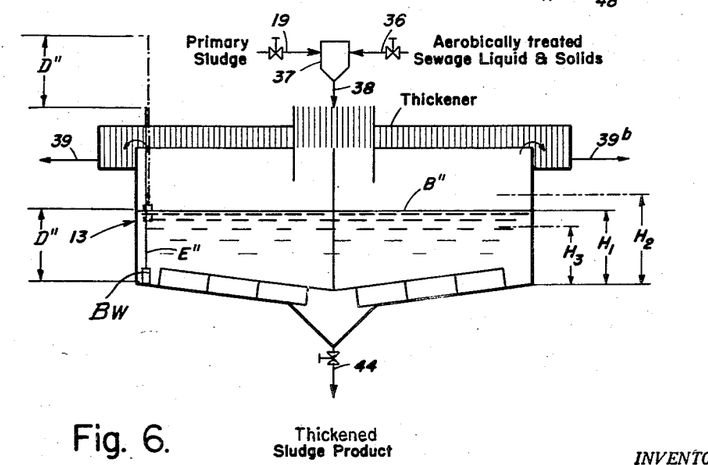
Figure 6 is an enlarged although diagrammatic detail view of the Figure 5 thickener station, illustrating a mode of measurement of the sludge bed therein as a control factor in the operation of the process.

Figure 6 shows the thickener 13 enlarged to emphasize the importance of establishing a sludge bed B″ therein, and illustrates the process control in respect to measurements of the sludge bed depth.

For example, with a given set of conditions, it may be desirable to maintain an optimum depth $H_1$ of the sludge bed B″, whereas a change in such conditions may make it desirable to operate with a sludge bed of a lower depth $H_3$ or of a greater depth $H_2$. Measurement of the depth of the sludge bed is here indicated as by means of a weight body BW at the lower end of a rod or chain. As the weight body is being lowered into the tank, an apparent loss of weight is experienced as the weight body enters the top strata of the sludge bed. The approximate depth D″ of the bed is thus determinable when the weight body is left to touch the tank bottom.

PROPERTIES AND CHARACTERISTICS OF THE THICKENED SLUDGE PRODUCT

When operating the aforementioned altered sewage treatment plant in accordance with this invention, there was obtained a thickened sludge which appeared as a grey or black-grey fairly homogenized, although lump containing mass of gel-like structure that is to say, a gelatinous concentrate herein referred to as a hydrogel or hydrogel sludge. Under plant operating conditions, the solids concentration in this sludge was between about 9% and about 14%.

When a sample of this sludge was poured from one container to another it was observed to contain or to consist largely of jelly-like shapeless lumps the equivalent size of say ¾″ balls in a gelatinous environment. When this sludge was subjected to the rapid stirring action of a laboratory homogenizer ("Waring Blendor") it was noticed that the shapeless lumps were reduced progressively in size depending upon the length of time of stirring. The stirring or homogenizing was performed on respective samples for periods of ½, 1, 2½, 5, 10 and 15 minutes respectively. After such stirring the sludge poured rather easily, yet its basic gel-structures as such appeared to be largely unaffected. Observations made up to 17 hours after the sample had been stirred indicated that the increased fluidity along with smaller gel lumps persisted, although some of the fluidity obtained by the rapid stirring was probably due to the entrainment of air. Thereafter upon standing, these samples become malodorous and appeared to be undergoing decomposition as evidenced by considerable gas production. Individual samples of the sludge were subjected to centrifugation in a laboratory centrifuge before and after a 15 minute period of rapid stirring or blending. From the unblended or raw sample approximately 40% by volume of supernatant liquor was released by centrifuging, while 48% was released by the other sample after blending and centrifuging. It appears from this centrifugation test that only a relatively small amount of additional liquor namely 8% was freed after the sludge had been blended for 15 minutes. The liquor released by the raw unblended sample was rather clear and yellow while that of the blended sample was opaque and grey to black in color. This sludge offers considerable resistance to flow when the solids concentration is in excess of 9–10% solids. Thus it appears that the real and complete jelly-like properties of the sludge are developed at or above a solids concentration of 9–10% under conditions encountered in the above referred to altered sewage treatment plant. Thus, I have conducted the thickening process of this invention within a solids concentration beyond a point or break $k$ of the graph of Figure 4 as well as beyond a break of the curve in Figure 2 when operating that plant.

*Example*

I have carried out the process according to the teachings of this invention in a sewage treatment plant in which the sewage is first subjected to primary settling in a primary clarifier tank. The effluent from the primary tank, was subjected to aeration in the presence of what is known as a high rate activated sludge biological floc for two to three hours, and this aerated sewage was subsequently subjected to settling in a secondary clarifier tank. In carrying out this process the primary clarifier sludge was withdrawn at an average rate which produced a dilute sludge of approximately 3% solids content, and substantially free from biological decomposition products. Under these conditions, the ratio of volume of the liquor in the primary sludge to the volume of the raw sewage being treated was about 3 to 1000. The secondary clarifier sludge was withdrawn at a concentration of about 0.1% solids substantially free from biochemical decomposition products and its volume represented about 10% of the volume of the raw sewage influent. A portion or roughly one-half of this sludge volume was continuously pumped to a point of confluence with the primary sludge for subsequent thickening. The mixed primary and secondary raw sludges were discharged continuously into a thickening tank while thickened sludge was being withdrawn every hour. Under these operating conditions, the ratio of the aerobically treated liquor in the secondary sludge to the primary sludge was as 5% to 0.3% or as 16.66 to 1.

The thickening tank was 50′ in diameter, 10′ sidewall depth, had a shallow conical bottom, a peripheral overflow weir with effluent launder, central feed, and rotary sludge raking mechanism provided with inclined blades and picket fence.

The thickening operation was controlled so that there was a sludge bed formed and held of such volume as to be equal to about 0.3 of a day's volume of thickened sludge withdrawn in the warmer weather. In colder weather the volume of the sludge bed volume held was equal to twice the volume of thickened sludge withdrawn per day. This sludge bed was composed of about 3% solids in its upper strata and 8% to 24% solids at the lowest point of the thickener in the immediate vicinity of the sludge withdrawal pipe. Under these operating conditions, the detention time of the solids undergoing thickening in the sludge bed varied from roughly 5 hours during the warmer season to about 30 hours or more during colder weather. Accordingly, the average depth of the sludge bed varied from 1′ to 5′ as measured in terms of the cylindrical equivalent average depth of the tank. The thickened sludge concentrations obtained under these conditions varied, on a daily basis, from about 9% to about 14% and to as high as about 24% solids content. While there were some variations of the solids loading on the thickener, the average loading under the foregoing operating conditions was 20 pounds of dry solids thickened per sq. ft. of thickening tank area per day, while the average volume of the influent mixed sludges was 2.1 M. G. D. and the volume of the effluent was 2.06 M. G. D. Accordingly, the ratio of the effluent volume to the volume in the thickened sludge was as 53 to 1.

Thus, there were obtained average thickened sludge concentrations in excess of 10% solids without appreciable biochemical decomposition occurring in the sludges being admitted to the thickening tank or in the thickening tank.

By comparison, prior to operating this plant in accordance with this invention, the combined total volume of the primary and secondary sludges was 370 cubic ft. per million gallons of raw sewage treated, whereas when operating according to the teachings of this invention the volume of the thickened mixed raw sludges was but 130 cubic ft. per million gallons of sewage treated; thus there was effected a 65% saving in the volume of sludge to be further handled and disposed of by digestion.

However, in terms of digester volume the percentage of savings appears even greater if considered in view of the multi-stage digestion system initially referred to.

In sewage treatment plants employing aerobic treatment of primary effluent, the digestion capacity is usually designed at 3 to 5 cubic feet per capita of connected population, or an average of about 4 cubic feet of digester volume for each person connected to the plant. With two-stage digestion, this capacity is divided between a primary and a secondary digestion tank. Volumetrically, the primary digester tank utilizes about half of this capacity, while the secondary digester tank utilizes the other half. The primary digester stage serves to digest and gasify the major portion of the gasifiable solids. The residual sludge is transferred from the primary to the secondary stage there to have some of the residual gas extracted even as supernatant liquor is being rendered.

In the practice of this invention the raw sludge is thickened to substantially the same volume as would result from treatment in a two-stage digestion system while digestion proper can be confined to a relatively small single stage digester system. That is, since the new method furnishes raw sludge of about three times the concentration of ordinary raw sludges, only ⅓ of heretofore needed primary digester tankage is required. That is to say, the secondary digester volume is eliminated while the primary digester volume is reduced by two thirds. Therefore, the saving in digester tank volume is 50%+⅔ of 50%=84% of the present day two-stage digester volume. Let it be assumed that the average construction cost of digester volume is $1.50 per cubic foot, which at 4 cubic foot per capita results in a per capita cost of construction of $6.00. There is thus effected a saving of 84% of $6.00 or $5.04 per person. A saving of this magnitude is realizable not only in new plant construction, but also in those plants where expansion is required.

Concurrently, great savings in fuel energy are attainable, with but one-third of the former sludge volume delivered to the digester requiring to be heated. In addition there is the considerable reduction in heat radiation losses because of such a reduction in tank size.

While unexpected and cumulative savings are attainable by concentrating raw primary and secondary sludges in accordance with this invention the teachings of this invention are applicable to a treatment system having no secondary treatment phase or where the secondary treatment might be suspended during part of the year, and hence where the problem is one of separately concentrating primary clarifier sludges.

Where secondary liquor is not available to satisfy the requirements of the thickening operation, I may employ as auxiliary liquid a controllable volume of water from other sources, such as river water or city water containing an appreciably smaller amount of non-aqueous constituents or solutes or polluting matter than is contained in the liquor of the primary type sludge. However, I have also satisfied the liquid requirements of this invention, by withdrawing the primary sludge at an exceptionally high dilution instead of adding the aforementioned auxiliary liquids. In this way, without requiring the employment of dosing chemicals, I have obtained thickened primary sludge of a very high concentration.

To indicate the absence of secondary treatment (in Figure 5) requires the provision of a waste discharge connection 21ª having a valve 21ᵇ to dispose of primary clarifier effluent, as well as the provision of a valve 21ᶜ for closing the flow of primary effluent to the aerobic treatment station 11. In that instance there may be provided a controllable supply 13ª to the thickening station 13 of auxiliary liquid such as river water or city water.

By comparison with thickened mixture of primary and secondary sludges the raw primary sludge if concentrated in this manner appears to be of less gelatinous nature and rather of a somewhat more fibrous appearance and also of somewhat greater viscosity even approaching plasticity which is here attributed to the absence of secondary or aerobically treated sludge solids and thus to the absence relatively of what may be termed their "lubricating effect" upon the primary solids.

For the purpose of determining and controlling the sludge bed depth in tank 13 in accordance with the teachings of this invention, there was used a simple probe or indicator in the form of a weight or test body to be lowered into the thickening tank. The entry of that body into the sludge bed was indicated by an apparent loss of weight of the test body because of the higher specific gravity of the sludge as compared with the body of liquid above it. The relative measure of the depth of the sludge bed was obtainable during the lowering of the test body by measuring the distance between the point where loss of weight occurred to the point where the test body touched the tank bottom.

Such instrumentality for measuring the depth of the sludge bed is indicated in Figure 6 by a test body BW and a suspension element E″ therefor. The bottom position of the body BW is shown in full lines, while its upper position is shown in dot-and-dash lines, the distance D″ between both positions designating the measured depth of the sludge bed as one criterion for conducting the thickening operation.

As a modification in the conduct of the process, a suitable quantity of secondary sludge is transferred to the primary clarifier for mixture with raw primary sewage solids, so that the underflow of the primary clarifier will furnish the mixture of the two sludges for delivery to the separate thickening station, there to be subjected to the controlled thickening operation such as herein set forth, in the presence of the suitable proportion of liquid or secondary clarifier effluent.

To summarize the invention with respect to the substance presented so far, there is obtainable by practicing this thickening process a sludge of exceptionally high solids concentration heretofore unattainable. When subjecting this thickened sludge to digestion the production of digestion supernatant liquor is minimized or eliminated. Supernatant liquor heretofore a necessary by-product of digestion, is highly objectionable for well-known reasons, since it must be recirculated to the head of the plant for retreatment imposing extra load on the plant operation thus reducing treatment efficiency. At the same time spectacular savings are attained with respect to digester tank volume required as well as digester heat requirements.

The practical operation of this thickening process is conducted within certain ranges of Solids Loading Rates and Liquid Loading Rates, the Solids Loading Rate being expressed in terms of weight of dry solids per unit area per unit time (lbs./sq. ft./day), the Liquid Loading Rate being expressed in terms of volume of liquid overflowing per unit area per unit time (gal./sq. ft./day).

Thus, the operational control of this thickening process requires the coordination of these operating factors.

(a) The relative Solids Detention Time in terms of the Sludge Volume Ratio.

(b) Sludge Bed Depth to determine sludge bed volume held.

(c) The Solids Loading Rate.

(d) The Liquid Loading Rate.

(e) Dilution or solids-to-liquid ratio of the Feed Sludge supplied to the Thickener.

In the practice of this process, when thickening a particular type of sludge there is selected a solids loading rate as well as a liquid loading rate in conjunction with a suitable sludge volume ratio. The liquid loading rate should be controlled to lie in the range whereby it is sufficiently high to prevent septicity and insufficiently high to cause undue loss of solids containment. The selected solids loading rate lies in a range having an upper limit beyond which excessive loss of solids containment and solids concentration occurs, while the lower limit is that solids loading rate below which the sludge bed depth becomes insufficient for determining the sludge volume ratio or relative solids detention time. The selected solids loading rate together with the selected liquid loading rate defines the dilution or concentration of the influent sludge to be thickened, whereas the selected solids loading rate in conjunction with a selected sludge volume rato (S. V. R.) value defines a suitable sludge bed depth from which the highly concentrated sludge can be withdrawn, namely of a concentration corresponding to a value of the upper portion of its thickening behavior curve of the particular sludge.

According to this invention a suitable solids detention time can be maintained within a range extending along the upper portion of the thickening behavior curve even while the solids loading rate may fluctuate. That is to say, if the solids loading rate increases, the depth of the sludge bed will increase, then in order to maintain the solids detention time the sludge withdrawal rate is increased correspondingly. On the other hand, if the solids loading rate decreases, the sludge bed will decrease in depth and the sludge withdrawal rate will be decreased correspondingly.

In the practice of this invention sludge can be withdrawn from the primary clarifier nearly continuously at high dilution in an unaged condition, even while imposing exceptionally high solids loading rates upon the thickening tank itself. Such practice contrasts sharply with the present mode of operation insofar as appreciable increases in sludge concentration are practically impossible and attempts to attain such increases in the clarifier itself results in serious impairment of the primary clarifier effluent and thus in treatment efficiency. In the practice of this invention, these primary clarifier sludge solids are crowded through a very much smaller thickening tank at those high solids loading rates and in a sludge bed of controlled depth to produce sludge of high solids concentration while avoiding septicity and achieving high solids containment. At the same time the controls must be such that the solids detention time in the sludge bed is made short enough to prevent septicity, yet long enough to obtain high solids concentration.

Normal fluctuations in solids loading rate are here accommodated or absorbed by the rise and fall in the bed depth which in turn governs the sludge withdrawal rate in accordance with a chosen operating point in the upper portion of the behavior curve of the sludge. This means that the withdrawal rate can be adjusted so that the solids detention time will be substantially the same even though the load be fluctuating. This provides operational flexibility whereby those high sludge concentrations are obtainable consistently. On the other hand, seasonal changes in sewage temperature which effect the permissable solids detention time are accommodated by a corresponding change of solids detention time consistent with the upper portion of the graph. That is to say (see Figures 2 and 3) with rising sludge temperatures the chosen operating point may be moved relatively leftward towards point $a$ of Figure 2, whereas with falling temperatures the operating point may be shifted relatively to the right towards point $b$. In respect to avoiding septicity the liquid detention time may be decreased by increasing the liquid loading rate when operating with sludges of higher temperatures.

This invention involves the discovery that with such controls as above set forth these sludges can be rapidly concentrated during a period of detention time long enough to attain high solids concentration yet short enough to avoid their aging to a point where septic gassing will occur.

Figure 7:
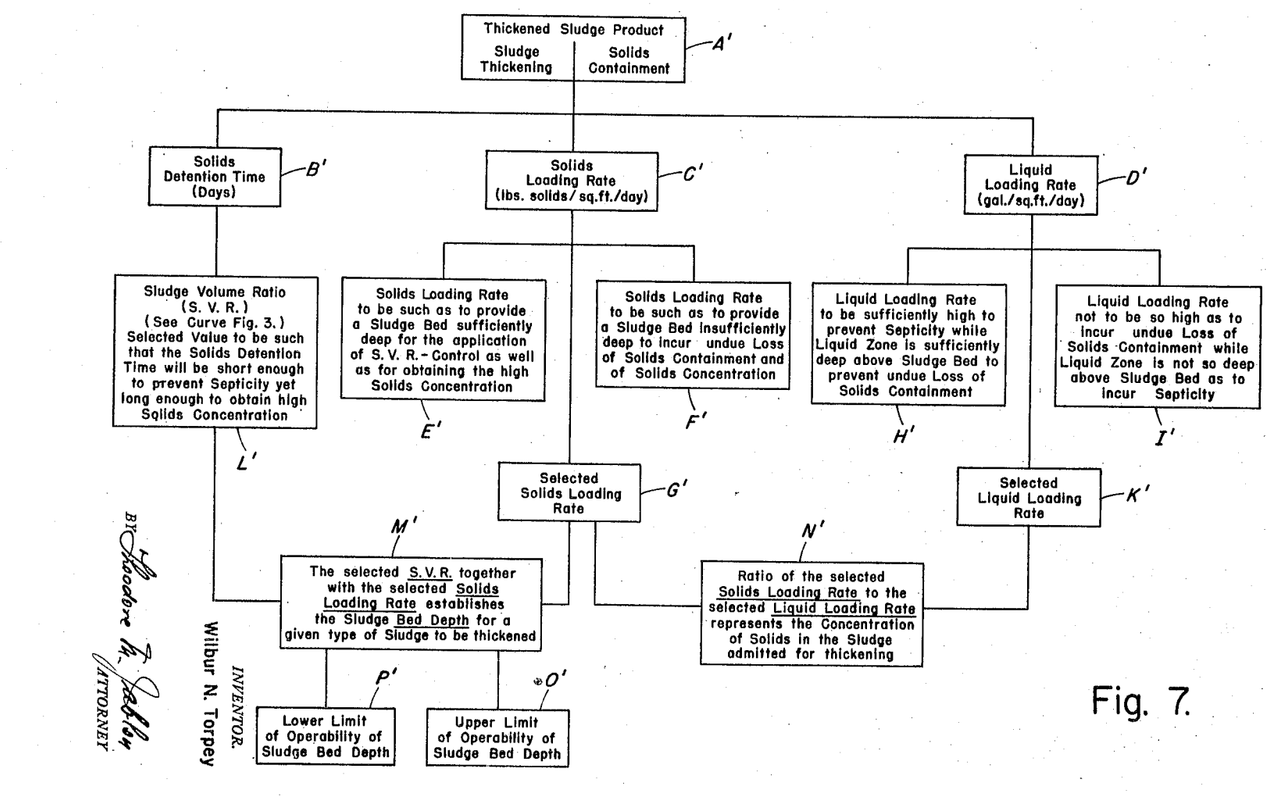
Figure 7 is a chart presenting the control factors in this sludge thickening process, and their interrelationship.

The invention in its broad application to the thickening of putrescible sludges derived by the clarification treatment of liquid wastes, presents itself in the Figure 7 chart showing the control factors in their mutual relationship. The chart conveniently presents the inter-relationship between the "Solids Loading Rate," "Solids Detention Time," "Liquid Loading Rate." This chart further shows how the "Solids Loading Rate" is interrelated with the "Solids Detention Time" by way of the "Sludge Bed Depth," and further how the "Solids Loading Rate" is interrelated with the "Liquid Loading Rate" by way of the concentration of the solids in the sludge admitted for thickening.

Thus, in box A' at the head of the Figure 7 chart there appears the "Thickened Sludge Product" as a result of "Sludge Thickening" and "Solids Containment." In boxes B', C', D' the chart presents "Solids Detention Time" in days, "Solids Loading Rate" in pounds of solids/sq. ft./day and "Liquid Loading Rate" in gals./sq. ft./day.

The "Solids Detention Time" of box B' has appended or subordinate to it box L' requiring the selected value of the Sludge Volume Ratio of the behavior curve to be short enough to prevent septicity yet long enough to obtain high solids concentration. The concept of Sludge Volume Ratio is here indicated to measure relative solids detention time.

In boxes E' and F' the chart indicates the upper and lower limits for the "Solids Loading Rate" of box C' with box G' representing a selected intermediate value thereof. Boxes H' and I' indicate the upper and lower limits for the "Liquid Loading Rate" of box D' with box K' representing a selected intermediate value thereof.

The "Sludge Bed Depth" is represented by what is indicated in box M' stating that the relationship of the "Sludge Volume Ratio" (of box L') to the "Solids Loading Rate" of box G' establishes a Sludge Bed Depth for a given type of sludge to be thickened.

The upper and lower "Limits of Operability" of the "Sludge Bed Depth" are presented by boxes O' and P' where the lower limit is governed by the measurability of the bed depth and by solids concentration while the upper limit is governed by solids containment and solids concentration in the thickening tank.

With respect to box N', the concentration of solids in the sludge admitted for thickening is representable by the combination of a selected "Solids Loading Rate" in box G' and a selected "Liquid Loading Rate" in box K'. In this way, this chart shows graphically how the "Sludge Bed Depth" of Box M' is operationally interrelated with the concentration of solids in the sludge admitted for thickening of box N' by way of the selected "Solids Loading Rate" of box G'.

This thickening process will now be described in its particular application to sewage sludges, for example, such categories thereof as Primary Sludge, Mixture of Primary with High Rate Activated Secondary Sludge, and Mixture of Primary Sludge with Conventional Activated Sludge. This will include first a description of these sewage sludges with respect to their origin and derivation from their respective sewage treatment systems; then to include a description and discussion of the thickening behavior curves of these sewage sludges with respect to conducting the thickening operation under conditions that correspond to the upper portion of those behavior curves; then to include operating examples as well as operational ranges (Tables I and II) of the control factors applicable in the thickening of those sludges; and furthermore to include tabulations (Tables III, IV, V) for a given thickened sludge concentration and a given liquid loading rate which tables contain a selected group of operable sludge bed depths with their associated values of Solids Loading Rates and S. V. R.'s applicable in the thickening of those sewage sludges in view of their behavior curves as well as in view of what the examples teach.

Figure 3:
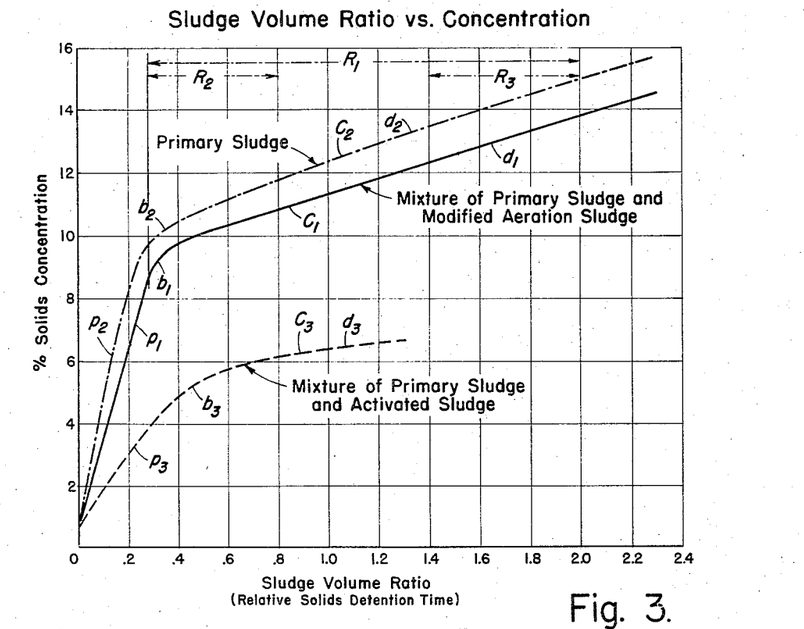
Figure 3 shows graphs in the form of thickening behavior curves in terms of solids concentration vs. relative sludge solids detention time in the sludge bed, for various categories of sludge being thickened in accordance with the process of this invention.

A primary clarifier sludge such as is representable by the behavior curve $C_2$ comprises the settable material present in the raw sewage, and removed to the extent of ⅓ to ⅔ of the total of suspended solids, with a solids detention time of 1 to 3 hours in the primary clarifier tank. For the purpose of this invention, what is herein termed primary clarifier sludge may include primary sludge obtained where primary clarification treatment is preceded by aeration treatment or other kinds of treatment serving to improve flocculation and to so aid primary sedimentation. That is to say, such primary clarifier sludge would contain the normally settleable solids along with a portion of the normally non-settleable suspended solids.

A sludge mixture such as is representable by the behavior curve $C_1$ includes, in addition to the primary clarifier sludge, that kind of secondary treatment sludge that results from treatment of the primary clarifier effluent by the so-called modified or high rate aeration process. As an overall result of these primary and secondary treatments there are removed from the raw sewage about ⅔ to 9/10 of the total suspended matter. This type of secondary treatment of primary effluent is generally understood to be a treatment whereby the primary effluent is aerated in the presence of a small quantity of biologically active sludge floc for a relatively short period of time, producing a secondary sedimentation sludge somewhat raw in character and similar to its thickening characteristics to sludge derived from what is today known as high rate biological trickling filtration. It is this mixture of such secondary sludge with primary sludge that is to be subjected to the thickening process proposed by this invention, and it is thus that the behavior curve $C_1$ (Figure 3) runs relatively close to the behavior curve $C_2$ of the primary clarifier sludge.

A sludge mixture such as is representable by the behavior curve $C_3$ contains in addition to the primary clarifier sludge, the secondary sludge that results from conventional or full activated sludge treatment of the primary clarifier effluent. As an overall result of both the primary and the secondary treatment there are removed from the raw sewage 85% to 95% of all suspended matter. Such conventional aerobic treatment usually known as activated sludge treatment is generally understood to be a treatment whereby primary effluent is aerated in the presence of a relatively large quantity of biologically active floc and usually for a period of time longer than required for the high rate aerobic treatment. This sludge is somewhat similar to that derived from conventional trickling filtration in respect to its thickening characteristics.

The Figure 3 thickening behavior curves $C_1$, $C_2$, $C_3$ bear a resemblance to the three behavior curves of Figure 2. In Figure 2 the sludge concentration is shown as a function of absolute Solids Detention Time in days, whereas in Figure 3 the sludge concentration is shown in terms of "Relative Solids Detention Time" as measured by the "Sludge Volume Ratio" (S. V. R.).

The Figure 2 curve $a$—$b$ fairly closely corresponds in its characteristics and relative location to the Figure 3 curve $C_1$ both behavior curves being representative of the thickening of a mixture of primary sludge with modified (high rate) aeration sludge, whereas the Figure 2 curve $a'$—$b'$ compares with curve $C_2$ which latter curve is representative of the thickening of primary sludge per se, and the Figure 2 curve $a''$—$b''$ compares with curve $C_3$ which latter is representative of the thickening of a mixture of primary sludge with conventional activated sludge.

With respect to the Figure 3 behavior curves $C_1$, $C_2$, $C_3$ the relative location of each curve may vary somewhat because of changes in operating conditions such as variations in the solids loading rate, or in proportioning of the primary and secondary sludge mixtures, or else variations in the proportion of volatile matter in the sludge solids.

The Figure 3 behavior curves $C_1$, $C_2$, $C_3$ plotted for the aforementioned three categories of sludges exemplify the results of extended periods of operation. Characteristically, each of these curves exhibits a fairly steeply rising initial inner branch $p_1$, $p_2$, $p_3$ respectively an intermediate bend or break or transitional portion $b_1$, $b_2$, $b_3$ respectively and a more gently rising or shallow outer branch $d_1$, $d_2$, $d_3$ respectively. These graphic characteristics are more sharply marked for the $C_1$ and $C_2$ category sludges than they are for the $C_3$ category. What is herein referred to as the upper portion, substantially comprises the outer shallow portion as well as the transitional portion.

The Figure 3 behavior curves $C_1$ and $C_2$ show relatively little distinction from each other as to thickening behavior and such differentials as there are in their positions relative to one another will depend upon the specific set of the control factors under which they are derived.

Referring to Figure 3, when conducting the process for example under controlled conditions along the upper portions of the behavior curve $C_1$, a relatively cool sewage sludge can be thickened within a wide range as exemplified by the range $R_1$ of Sludge Volume Ratio, whereas a relatively warm sewage sludge must be thickened within a much narrower range as exemplified by the range $R_2$ of Sludge Volume Ratio, both ranges $R_1$ and $R_2$ being located upon the upper portion of the behavior curve although having their respective lower values located in the transitional portion of that curve. The upper or outer operating limit of these ranges $R_1$ and $R_2$ is governed by the point at which biological activity and consequent gasification will upset the thickening process at the respective sewage temperatures.

The wide operating range $R_1$ offers the advantage of being able to operate at the higher S. V. R. values with a corresponding moderate extra gain in thickened sludge concentration, as in the outer range $R_2$ when relatively lower sludge temperatures are encountered.

In the case of the warm sewage the operating range $R_2$ indicates that close operational control of the S. V. R. is necessary. It is an aspect of this invention that such S. V. R. control within the range $R_2$ can be achieved conveniently by relatively increasing the Solids Loading Rate sufficiently to produce a deeper sludge bed while maintaining the S. V. R. within the required narrow range $R_2$, in a manner further described below. This means that at the higher sludge temperatures, the close control of the S. V. R. can be achieved conveniently in view of the fact that considerable changes in measurable bed depth would then represent but small differentials in S. V. R.

Thus, it is a significant although paradoxical feature of this invention, that high sludge temperatures can be accommodated by relatively higher solids loading rates without appreciable loss of thickened sludge concentrations.

In the practice of this invention with respect to the aforementioned three categories of sewage sludges, the data derived from extended plant operation are presented in the following Table I.

TABLE I

Operating examples of sewage sludges containing solids having about 75% volatile matter including normal domestic and industrial waste components. Range of usual sludge temperatures 55°–80° F.

|  | Primary sedimentation treatment | Primary and high rate secondary treatment | Primary and activated treatment | Sludge |
|---|---|---|---|---|
| Thickened sludge concentration in percent solids | 12.0 | 11.2 | 6.0 | 5.6 |
| Solids loading rate, lb./sq. ft./day | 16 | 19 | 12 | 14 |
| Liquid loading rate in gals./sq. ft./day | 800 | 1,000 | 500 | 700 |
| Relative solids detention time as measured by S. V. R. | 1.7 | .8 | .8 | 2.8 |
| Sludge bed depth in ft | 3 | 3 | 3 | 5 |
| Concentration of influent sludge, p. p. m., of suspended solids | 2,300 | 2,700 | 2,800 | 2,400 |
| Percent solids containment in thickener | 92 | 89 | 96 | 98 |

It will be seen that the operating data of Table I fall substantially within the ranges of operating factors and results shown in the following Table II which in turn offers a guide applicable to substantially average and normal conditions with respect to sludge characteristics and temperature.

TABLE II

Showing the ranges of operating Factors and Results based upon year-round operation in thickening the sludges derived from three categories of sewage treatment.

Sludges containing solids having about 75% volatile matter including normal domestic and industrial waste components.

Range of usual sludge temperature 55°–80° F.

|  | Primary clarification treatment | Primary clarification followed by high rate secondary treatment | Primary clarification followed by conventional secondary treatment |
|---|---|---|---|
| Concentration of thickened sludge, percent solids | 9–15 | 7–14 | 4–9 |
| Solids loading rate, lbs./sq. ft./day | 10–40 | 8–35 | 4–20 |
| Liquid loading rate, gal./sq. ft./day | 500–1,500 | 500–1,500 | 250–1,000 |
| Relative solids detention time measured by sludge volume ratio | ¼–2 | ¼–2 | ½–3 |
| Sludge bed depth in ft | 1–5 | 1–5 | 1–5 |

The ranges of results and control factors in Table II should be understood as indicating that the lower thickened sludge concentrations are associated with the higher solids loading rates as well as associated with lower sludge volume ratios. By the same token, the higher sludge concentrations are associated with lower solids loading rates as well as associated with relatively higher sludge volume ratios.

The Liquid Loading Rate (Table II) should generally tend towards the higher values of its range to accommodate the warmer sludges so as to discourage and prevent septicity, yet should tend towards the lower values where the lower thickened sludge concentrations are involved, so that undue loss of solids containment in the tank may be avoided.

The teaching with respect to controlling the process outlined in the Figure 7 chart and in the behavior curves of Figure 3 will now be implemented for a chosen liquid loading rate and an attainable thickened sludge concentration by way of calculating and tabulating sludge bed depths with their associated solids loading rates and S. V. R.'s. The following Tables III, IV, V, contain such tabulations for the respective aforementioned three categories of sewage sludges.

TABLE III

Showing the Sludge Bed Depths for thickening Primary Sludge derived from the sedimentation of sewage.

Sludge containing solids having about 75% volatile matter including normal domestic and industrial waste components.

Range of usual Sludge Temperatures 55°–80° F.

Values of Bed Depths calculated for an average Thickener Underflow concentration of 12% solids, and for a Liquid Loading Rate of 1000 gals./sq. ft./day.

| Influent sludge concentration (p. p. m. suspended solids) | Solids, #/sq.ft./ day | Bed depth for S. V. R. ⅓ | Bed depth for S. V. R. ⅔ | Bed depth for S. V. R. 1 | Bed depth for S. V. R. 1⅓ | Bed depth for S. V. R. 1⅔ |
|---|---|---|---|---|---|---|
| 250 | 2.08 | .088 | .18 | .26 | .34 | .43 |
| 500 | 4.16 | .18 | .34 | .54 | .72 | .90 |
| 1,000 | 8.32 | .36 | .72 | 1.1 | 1.4 | 1.8 |
| 1,500 | 12.5 | .52 | 1.0 | 1.6 | 2.2 | 2.7 |
| 2,000 | 16.6 | .72 | 1.4 | 2.2 | 3.0 | 3.7 |
| 3,000 | 25.0 | 1.1 | 2.2 | 3.2 | 4.2 | 5.3 |
| 4,000 | 33.2 | 1.5 | 3.0 | 4.2 | 5.6 | 7.0 |
| 5,000 | 41.6 | 1.7 | 3.4 | 5.4 | 7.2 | 9.0 |
| 7,500 | 62.4 | 2.6 | 5.2 | 8.0 | 10.6 | 13.0 |
| 10,000 | 83.2 | 3.6 | 7.2 | 10.6 | 14.2 | 18.0 |
| 20,000 | 166.0 | 7.2 | 14.4 | 21.4 | 28.6 | 36.0 |
| 30,000 | 250.0 | 10.8 | 21.6 | 32.0 | 42.8 | 53.0 |

TABLE IV

Showing the Sludge Bed depths for thickening a mixture of Primary and Secondary Sludges derived as from high rate activated treatment, high rate trickling filtration, etc.

Sludges containing solids having about 75% volatile matter including normal domestic and industrial waste components.

Range of usual sludge temperatures 55°–80° F.

Values of Bed Depths calculated for an average Thickener Underflow Concentration of 10% solids, and for a Liquid Loading Rate of 1000 gals./sq. ft./day.

| Influent sludge concentration (p. p. m., suspended solids) | Solids, #/sq. ft./ day | Bed depth for S. V. R. ⅓ | Bed depth for S. V. R. ⅔ | Bed depth for S. V. R. 1 | Bed depth for S. V. R. 1⅓ | Bed depth for S. V. R. 1⅔ |
|---|---|---|---|---|---|---|
| 250 | 2.08 | .11 | .22 | .32 | .44 | .54 |
| 500 | 4.16 | .21 | .42 | .64 | .84 | 1.1 |
| 1,000 | 8.32 | .43 | .86 | 1.3 | 1.7 | 2.2 |
| 1,500 | 12.5 | .63 | 1.3 | 1.9 | 2.6 | 3.2 |
| 2,000 | 16.6 | .87 | 1.7 | 2.6 | 3.4 | 4.3 |
| 3,000 | 25.0 | 1.3 | 2.6 | 3.8 | 5.2 | 6.4 |
| 4,000 | 33.2 | 1.7 | 3.4 | 5.1 | 6.8 | 8.5 |
| 5,000 | 41.6 | 2.1 | 4.2 | 6.4 | 8.4 | 11.0 |
| 7,500 | 62.4 | 3.2 | 6.4 | 9.6 | 13.0 | 16.0 |
| 10,000 | 83.2 | 4.3 | 8.6 | 13.0 | 17.0 | 22.0 |
| 20,000 | 166.0 | 8.7 | 16.0 | 26.0 | 32.0 | 42.0 |
| 30,000 | 250.0 | 13.0 | 26.0 | 38.0 | 52.0 | 64.0 |

TABLE V

Showing the Sludge Bed Depths for thickening a mixture of Primary and Secondary Sludges derived as from Conventional Activated Sludge Treatment, Conventional Trickling Filtration Treatment, etc.

Sludge containing solids having about 75% volatile matter including normal and industrial waste components.

Range of usual Sludge Temperatures 55°–80° F.

Values of Bed Depths calculated for an average thickener underflow concentration of 6% solids, and for a liquid loading rate of 500 gals./sq. ft./day.

| Influent sludge concentration (p. p. m., suspended solids) | Solids, #/sq. ft./day | Bed depth for S. V. R. ⅓ | Bed depth for S. V. R. ⅔ | Bed depth for S. V. R. 1 | Bed depth for S. V. R. 1⅓ | Bed depth for S. V. R. 1⅔ |
|---|---|---|---|---|---|---|
| 250 | 1.04 | .090 | .18 | .27 | .36 | .45 |
| 500 | 2.08 | .18 | .36 | .54 | .72 | .90 |
| 1,000 | 4.16 | .37 | .74 | 1.1 | 1.5 | 1.8 |
| 1,500 | 6.24 | .53 | 1.1 | 1.6 | 2.2 | 2.7 |
| 2,000 | 8.32 | .73 | 1.5 | 2.2 | 3.0 | 3.7 |
| 3,000 | 12.5 | 1.1 | 2.2 | 3.2 | 4.4 | 5.3 |
| 4,000 | 16.6 | 1.4 | 2.8 | 4.3 | 5.6 | 7.2 |
| 5,000 | 20.8 | 1.8 | 3.6 | 5.4 | 7.2 | 9.0 |
| 7,500 | 31.2 | 2.7 | 5.4 | 8.1 | 11.0 | 14.0 |
| 10,000 | 41.6 | 3.7 | 7.4 | 11.0 | 15.0 | 18.0 |
| 20,000 | 83.2 | 7.3 | 15.0 | 22.0 | 30.0 | 37.0 |
| 30,000 | 125.0 | 11.0 | 22.0 | 33.0 | 44.0 | 55.0 |

These Tables III, IV, V pertain to sewage sludges having a usual content in volatile matter of about 75% including normal domestic and industrial waste components, where the influent sludge is of a certain concentration, the thickened sludge is of a certain concentration such as is attainable by the practice of this invention, and where the range of usual sludge temperature is 55° to 80° F. For such sludges these Tables III, IV, V contain sludge bed depths computed on the basis of respective values of the Sludge Volume Ratio, and of the Solids Loading Rates.

That is to say, for any given pair of values of the Sludge Volume Ratio and an associated Solids Loading Rate, there is tabulated the resulting sludge bed depth; vice versa, the tables show for a given bed depth the respective values of Sludge Volume Ratio and Solids Loading Rate.

In the case of primary sludge (Table III) having 75% volatile matter, when operating at a suitable Liquid Loading Rate such as 1000 gals./sq. ft./day, and within a range of usual temperatures of 55°–80° F., there is attainable a thickened sludge having about 12% solids concentration. On this basis, the sludge bed depth is determinable and is tabulated from the combined data of Solids Loading Rate and of Sludge Volume Ratio.

For example, according to Table III, a primary sludge having 3000 p. p. m. concentration at a Liquid Loading Rate of 1000 gals./sq. ft./day and at a Solids Loading Rate of 25.0 lbs./sq. ft./day, would yield approximately a 12% thickened sludge, if the sludge bed depth be kept at 3.2 ft. at a Sludge Volume Ratio=1.0 (the sludge bed depth of 3.2 ft. appearing in the vertical column under S. V. R.=1.0).

Looking at Table III there appears reading down the left hand vertical column the influent concentrations of suspended solids in p. p. m. starting at 250 p. p. m. up to 30,000 p. p. m. while the second vertical column shows the respective Solids Loading Rates. Next are the vertical columns of various Sludge Bed Depths, each such column appearing underneath a respective value of Sludge Volume Ratio or relative solids detention time, the S. V. R. values here being shown as ⅓, ⅔, 1⅓, 1⅔ respectively. Theoretically, this tabulation of bed depth values could be expanded to include instances governed by more extreme temperature conditions, so as to include even higher values of S. V. R. but it is here confined to embracing an average practical scope of operation.

The values of Sludge Bed Depths in Tables III, IV, V arrived at as follows:

Referring for example to the kind of Sludge represented by Table III, in the case of an influent concentration of say 3000 p. p. m. with an overflow rate of 1000 gals./sq. ft./day, the Solids Loading Rate is $$1000 \times 8.3 \times 3000 = 25 \text{ lbs./sq. ft./day}$$

Since these solids will be withdrawn in the form of a thickened sludge having 12% solids concentration, $$25 \text{ lbs. solids} = .12X, \quad X = \frac{25}{.12} = 208 \text{ lbs. sludge}$$

This sludge will weigh 65 #/cu. ft. therefore $$\frac{208}{65} = 3.2 \text{ cu. ft.}$$

of sludge withdrawn per sq. ft. of thickener per day, which is the net downward rate of movement of the sludge bed in ft. per day, but since $$\text{S. V. R.} = \frac{\text{Volume of sludge held}}{\text{Volume pumped per day}}$$

therefore $$\text{S. V. R.} = \frac{\text{Sludge Bed Depth in ft.}}{\text{Net downward rate of movement of the sludge bed in ft./day}}$$

Consequently, for an S. V. R. of ⅓, we obtain $$\frac{1}{3} = \frac{\text{Bed Depth in ft.}}{3.2}$$

therefore Bed Depth held=1.07, say, 1.1 ft.

The same procedure may be used to establish similar tabulations for the other categories of sludges based upon their attainable concentrations, as well as for other Liquid Loading Rates.

There is indicated in Table III between bold-dash lines an area herein termed the sub-area outlining bed depth values associated with those values of Solids Loading Rates and S. V. R. that lie in ranges within which the invention can be practiced in consideration of the requirements of the chart of Figure 7 and of the behavior curve $C_2$ of Figure 3 as well as in consideration of the results experienced according to the data in Table I.

For example, it can be seen from Table III that for a Liquid Loading Rate of 1000 gals./sq. ft./day the sub-area within the bold-dash lines covers conditions associated with bed depths of 1 to 5 ft. which depths lie substantially within a practical range of bed depth operability and associated with practical ranges of solids loading rates and S. V. R.

As a specific feature of the invention, this sub-area contains a further restricted area as represented by a horizontal row of bed depths for a solids loading rate at which the year round changes in sludge temperature can be accommodated.

Such a horizontal row of values extending across the width of Table III can here be established by interpolation between the horizontal rows for Solids Loading Rates of 16.6 and 25.0 lbs./sq. ft./day respectively. Such an interpolated row would present a solids loading rate with its associated bed depths, adapted to accommodate the normal range of seasonal temperature changes without significant loss of solids concentration in the thickened sludge or undue loss of solids containment in the thickener tank. A suitable critical intermediate Solids Loading Rate would lie at about 22 lbs./sq. ft./day to provide for the seasonal changes in year round operation.

The sludge bed depths appearing in the upper right hand portion of the sub-area represent operating values applicable to the thickening of relatively colder sewages such as encountered in the winter time, to be thickened at the higher values of S. V. R.; whereas the bed depth values in the lower left hand portion of the sub-area represent operating values applicable to the thickening of warmer sewages such as encountered in the summer time to be thickened at the lower values of S. V. R.

In view of the respective upper and lower portions of the sub-area of the Table III, the invention may be practiced by carrying out the thickening process in a plurality of thickening tanks in parallel. That is to say, for warm sludges as in the summer time, the operation may be carried out in one tank or else in a lesser number of tanks to provide for relatively higher solids loading rates at relatively lower sludge volume ratios, whereas for cooler sludges, the operation may be carried out in a larger number of tanks to accommodate relatively lower solids loading rates at relatively higher sludge volume ratios.

In further support of the practical conduct of the thickening operation, there follows an example of how, for a given type sludge, a behavior curve may be plotted based upon a given solids loading rate and a given liquid loading rate, to present the thickened sludge concentration as a function of the Sludge Volume Ratio.

In a case of average primary clarifier sludge having 75% volatile matter and capable of thickening to 12% solids concentration, with a liquid loading rate of 1000 gals./sq. ft./day, and a solids loading rate of 21 lbs./per sq. ft./day, the concentration of solids in the thickener influent is:

$$\frac{21.0 \text{ lbs.}}{1000 \times 8.33 \text{ lbs. per gal.}} =$$

2500 p. p. m. = ¼% solids concentration

Sludge is withdrawn from the primary clarifier at 2500 p. p. m., the thickening operation is started by allowing a blanket or bed of sludge to form. When the sludge bed has increased in depth to 1′, withdrawing of the sludge is started at a rate such that the bed will remain at 1′ depth.

A composite sample of the sludge being withdrawn is taken over 24 hours, and its solids concentration determined.

The volume in cu. ft. of the sludge bed held in the tank is then divided by the volume in cu. ft. per day of sludge pumped, which quotient expresses in days the Sludge Volume Ratio.

$$\frac{\text{cu. ft. of Sludge Bed}}{\text{Thickened sludge pumpage in cu. ft./day}} = \text{S. V. R.}$$

and since $$\text{S. V. R.} = \frac{\text{Sludge Bed Depth in ft.}}{\text{Net downward rate of movement of the sludge bed in ft. per day}}$$

The operation is then repeated for sludge bed depths of 2, 3 and 4 feet respectively, and the same data as above are derived for those conditions, so that the sludge concentration vs. the S. V. R. can be plotted (see chart below), as follows:

Since the sludge withdrawn contains substantially the solids entering the tank, and since 21 lbs. of solids entered the tank per sq. ft./per day, the sludge withdrawn would have about 11% solids at this S. V. R. Consequently, since 21 lbs. of solids are contained in sludge having a solids concentration of 11%:

21 lbs. = 0.11$X$ and $X$ = 190 lbs.

of sludge withdrawn per day/sq. ft. of thickener.

Since this 11% solids sludge will weigh about 65 lbs./cu. ft., $$\frac{190}{65} = 2.9 \text{ cu. ft.}$$

of sludge is withdrawn per sq. ft. of thickener per day. Since this was for the 1′ bed depth, the detention time of the sludge is $$\frac{1}{2.9} \text{ days}$$

or about .34 day, S. V. R. = .34 day.

For a 2′ bed depth, if 21 lbs. sludge solids are withdrawn at 12% solids concentration, then 21 = .12$X$ lbs. of sludge are withdrawn per sq. ft. of thickener per day, that is $X$ = 175 lbs., then with $$\frac{175}{65} = \frac{2}{7} \text{ cu. ft.}$$

of sludge withdrawn per sq. ft. of thickener per day, $$\text{S. V. R.} = \frac{2}{2.7} = .74 \text{ day, S. V. R.} = .74 \text{ day}$$

For a 3′ bed depth, if 21 lbs. of solids are withdrawn at 14% solids concentration, then 21 lbs. = .13$X$ and $X$ = 162 lbs.

so that $$\frac{162}{65} = 2.5 \text{ cu. ft.}$$

sludge are withdrawn per sq. ft. thickener per day, and $$\text{S. V. R.} = \frac{3}{2.5} = 1.2 \text{ days}$$

For a 4′ bed depth, if 21 lbs. of solids are withdrawn at 14% solids concentration, then 21 lbs. = .14$X$, and $X$ = 150 lbs.

and $$\frac{150}{65} \text{ lbs.} = 2.3 \text{ cu. ft.}$$

of sludge/sq. ft. of thickener per day, hence $$\text{S. V. R.} = \frac{4}{2.3} = 1.74 \text{ days}$$

The subjoined curve shows the above S. V. R. values plotted against the Thickened Sludge Solids Concentrations.

Sludge Volume Ratio (S. V. R.)
vs.
Percent Solids Concentration

For Primary Solids (75% Volatile Matter)
Solids Loading Rate, 21 lbs./sq. ft./day
Liquid Loading Rate, 1,000 gals./sq. ft./day The process can also be practiced in a plant comprising primary clarification followed by aerobic treatment and secondary clarification. Such a plant considered for this particular application has a multiple tank arrangement for secondary clarification.

According to this embodiment, one section of the secondary clarifiers is employed for separating and returning seed sludge to the aerobic treatment station, whereas the remaining section of the secondary clarifiers is employed for thickening the mixture of primary clarifier and secondary treatment sludge. This means that a suitable portion of the aerobically treated sewage containing the secondary solids is diverted into the thickening section where it is to be thickened together with the primary clarifier solids. The thickening in that section to be conducted substantially under the control conditions of this invention.

That is to say, the proportion of secondary solids to be returned for supporting the treatment process relative to the proportion of solids to be thickened for disposal, is controllable by suitable conduit and valve arrangements between the aerobic treatment section and the portion of the secondary clarifier section used for thickening.

Dilute primary clarifier sludge is pumped to the thickening section simultaneously with a controlled portion of secondary sludge.

There has been set forth above a process for rapidly thickening putrescible sludges derived from putrescible liquid wastes, while maintaining high solids containment in the separately controlled thickening tank, and concurrently improving plant treatment efficiency, the control being with respect to values and correlation of the relative solids detention time as sludge volume ratio, solids loading rate, and liquid loading rate.

As herein set forth, close control of the relative solids detention time especially for higher sludge temperatures is achieved in the manner whereby the sludge bed is rendered time-sensitive so that the solids detention time will be long enough for the development of high solids concentration yet short enough to avoid any appreciable gasification of putrescible matter.

The invention is herein illustrated and substantiated with respect to the three categories of sewage sludges, by way of respective thickening behavior curves as well as numerical operating examples and guides. The behavior curves together with the examples point up the discovery of the high concentratability of the primary sludge when so duly controlled, together with the fact that by this control the high concentration of a primary type sludge is consistently maintainable even within a relatively narrow range of a desired portion of the curve, with respect to controlling physical characteristics of the sludge. In this manner, thickening of such sludge is maintainable for instance substantially at the break of the curve or within a range along the transitional portion of the curve.

In regard to thickening a mixture of primary and secondary sludge, the behavior curve together with examples points up and illustrates the discovery that under such controls the normally highly dilute and concentration-resisting secondary sludge is disposable substantially by interstitial embodiment into the primary sludge and with respect to the primary sludge solids. Such interstitial combination of the secondary with the primary sludge solids produces mixed sludge in which the secondary sludge has a lubricating effect with respect to the movement of primary solids in the handling and disposal thereof.

I claim:

1. The method of continuously treating wastes having contaminant putrescible solids and liquids to derive therefrom a readily treatable thickened sludge of such solids and liquids, which comprises subjecting such sewage to clarification by sedimentation in a clarifier to yield a superjacent body of liquor for effluent from the clarifier and a subjacent stratum of sludge adaptable for biological treatment, feeding sludge from that stratum to a sedimenting thickener to yield therein a superjacent body of liquor for effluent from the thickener and a subjacent bed of thickened sludge while controlling within limits certain factors of (a) detention time of sludge solids in the bed, (b) depth of the bed, (c) solids loading rate into the thickener, (d) liquid loading rate into the thickener, and (e) solids-to-liquid ratio in the feed to the thickener whereby the detention time is short enough to avoid septicity and gasification yet long enough to produce a sludge of abnormally high solids concentration; which factors involve regulating the detention time (a) of the solids in the thickener by varying the rate of withdrawal from the bed thereof in the thickener so that the ratio of sludge volume held in the bed compared with the volume of thickened sludge withdrawn per day from the bed lies in a range of from ¼ to 3, regulating the depth of the bed (b) by varying the withdrawal of thickened sludge from the thickener to maintain the depth of the bed to lie in a range of from 1 to 5 feet, regulating the solids loading rate (c) of the dry weight of the solids fed to the thickener by varying the feed thereof per day to lie in a range of from 4 to 40 pounds per square foot of thickener area, regulating the liquid loading rate (d) by varying the feed thereof per day to lie in a range of from 250 to 1500 gallons per square foot of thickener area, and regulating the solids-to-liquid ratio (e) in the feed to the thickener by varying the dilution thereof to lie in a range of from 1000 to 6000 parts solids to each million parts liquid; which method produces a thickener sludge which, when indicated on a graph having a sludge solids concentration represented on its ordinates and a sludge detention time represented on its abscissa will show a curve having a steeply ascending initial inner portion followed by an intermediate break portion continuing into a shallowly ascending outer portion with the solids concentration lying in a range substantially above the steeply ascending portion.

2. The method according to claim 1, in which said regulation of the liquid loading rate (d) and of the solids-to-liquid ratio (e) is effected by withdrawing solids sludge and liquor from the clarifier at a rate and at a dilution high enough to lie within said ranges of regulation.

3. The method according to claim 1, in which said regulation of the liquid loading rate (d) and of the solids-to-liquid ratio (e) is effected by adding to the sludge withdrawn from the clarifier diluent water of higher purity at least with respect to organic matter therein than the superjacent liquor in the clarifier in quantity to provide a rate high enough to lie within said ranges of regulation.

4. The method according to claim 1, with the addition of subjecting the thus thickened sludge to a single-stage digestion operation, and conducting said digestion operation under conditions of agitation.

5. The method according to claim 1, wherein the sewage sludge fed to the thickener comprises primary clarifier sludge whose treatment requires narrower ranges of the control factors as follows: varying the factor (d) to lie in a range of from 500 to 1500 gallons per square foot per day, varying the factor (a) to lie in a range of from ¼ to 2 in terms of the ratio of sludge volume held in the bed to the volume of thickened sludge withdrawn per day, varying the factor (c) to lie in a range of from 10 to 40 pounds of dry solids per square foot per day, varying the factor (e) to lie in a range of from 1000 to 6000 p. p. m., and varying the factor (b) to lie in a range of from 1 to 5 feet.

6. The method according to claim 1, with the addition of subjecting the clarifier liquor effluent to aerobic high rate biological treatment, subjecting the resulting treated sewage liquid to secondary clarification yielding secondary clarifier liquor effluent as well as secondary clarifier sludge, mixing clarifier sludge with the secondary clarifier sludge, and subjecting the sludge mixture to thickening with the thickening control factors being correlated by varying the factor (d) to lie in a range of from 500 to 1500 gallons per square foot per day, varying the factor (a) to lie in a range of ¼ to 2 in terms of the ratio of sludge volume held in the bed to the volume of thickened sludge withdrawn per day, varying the factor (c) to lie in a range of from 8 to 35 pounds of dry solids per square foot per day, varying the factor (e) to lie in a range of from 1000 to 6000 p. p. m., and varying the factor (b) to lie in a range of from 1 to 5 feet.

7. The method according to claim 1, with the addition of subjecting clarifier liquor effluent to aerobic biological treatment, subjecting the treated sewage liquid to secondary clarification yielding secondary clarifier effluent and secondary clarifier sludge, mixing the clarifier sludge with the secondary clarifier sludge, and subjecting the sludge mixture to thickening with the thickening control factors being correlated by varying the factor (d) to lie in a range of from 250 to 1000 gallons per square foot per day, varying the factor (a) to lie in a range of from ½ to 3 in terms of the ratio of sludge volume held in the bed to the volume of thickened sludge withdrawn per day, varying the factor (c) to lie in a range of from 4 to 20 pounds of dry solids per square foot per day, varying the factor (e) to lie in a range of from 1000 to 6000 p. p. m., and varying the factor (b) to lie in a range of from 1 to 5 feet.

References Cited in the file of this patent
UNITED STATES PATENTS

| | | |
|---|---|---|
| 1,880,773 | Buswell et al. | Oct. 4, 1932 |
| 1,982,246 | Fischer | Nov. 27, 1934 |
| 2,254,953 | Thomas | Sept. 22, 1941 |
| 2,458,163 | Hays | Jan. 4, 1949 |